United States Patent [19]

Montalvo, Jr.

[11] 4,000,685

[45] Jan. 4, 1977

[54] PUSH/PULL VALVE FOR TWO OR THREE WAY OPERATION

[76] Inventor: Edwin J. Montalvo, Jr., 283 Anderson St., Hackensack, N.J. 07601

[22] Filed: May 5, 1975

[21] Appl. No.: 574,464

[52] U.S. Cl. .............................. 91/469; 137/625.68
[51] Int. Cl.² ......................................... F16K 11/07
[58] Field of Search .............. 251/325; 137/625.25, 137/625.48, 625.68

[56] References Cited
UNITED STATES PATENTS

| | | | |
|---|---|---|---|
| 1,080,273 | 12/1913 | Fountain | 251/325 X |
| 2,291,563 | 7/1942 | Rotter et al. | 137/625.68 |
| 2,906,492 | 9/1959 | Conrad | 251/325 |
| 2,940,465 | 6/1960 | Frantz | 251/325 X |
| 3,146,793 | 9/1964 | Boys et al. | 137/625.48 X |
| 3,545,479 | 12/1970 | Loe | 137/625.68 X |

*Primary Examiner*—Alan Cohan
*Attorney, Agent, or Firm*—Brooks, Haidt, Haffner & Delahunty

[57] ABSTRACT

A valve for introducing air or other fluid into a fluid actuated mechanical device has an L-shaped passage through a valve stem. The valve stem is movable lengthwise between open and closed positions. In a fully open position the L-shaped passage delivers fluid from a source of fluid under pressure to a channel in a housing. In closed position the delivery end of the L-shaped passage is blocked. The valve stem also provides means for venting fluid from the channel while the L-shaped passage is blocked, when the stem is in an intermediate position.

10 Claims, 4 Drawing Figures

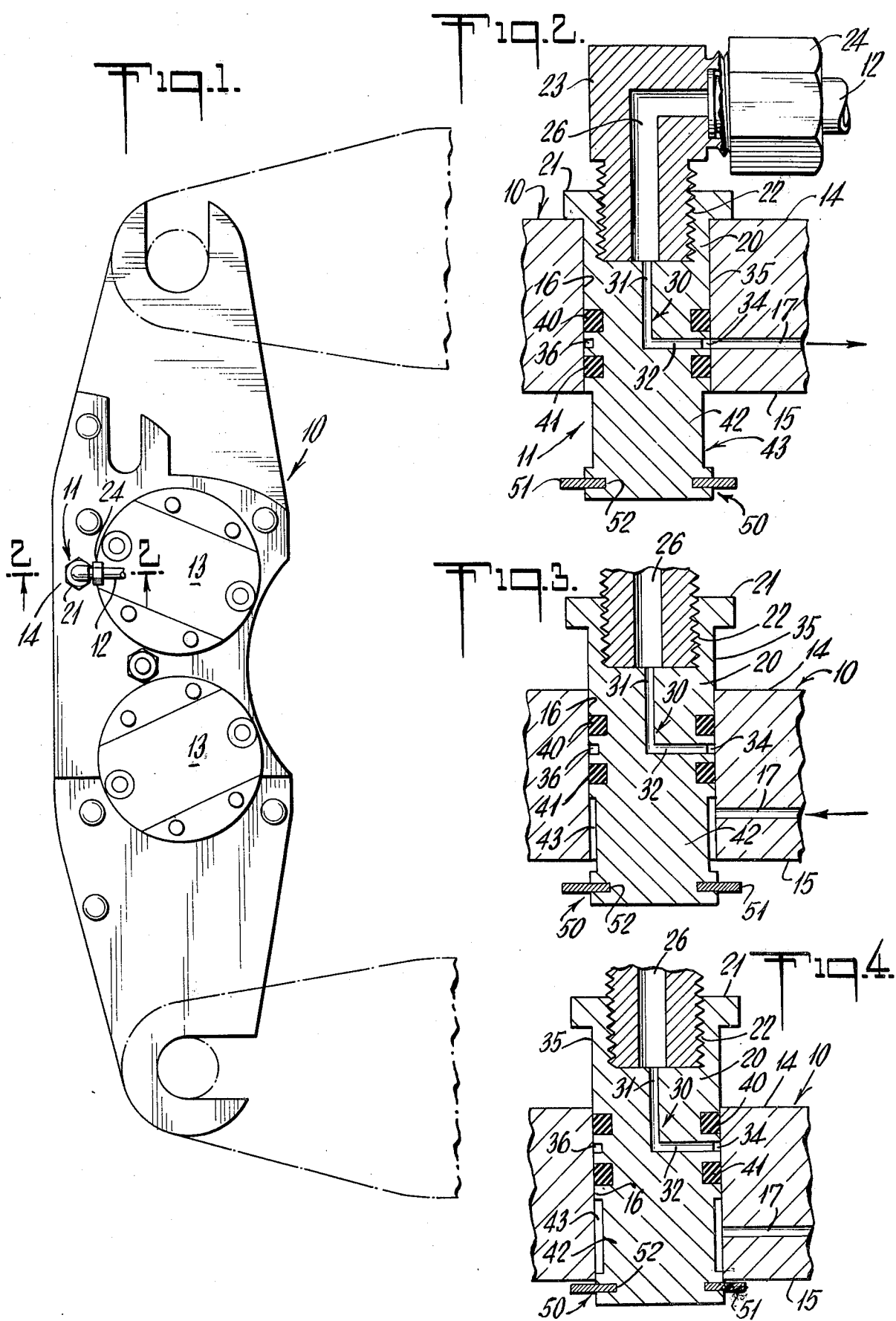

PUSH/PULL VALVE FOR TWO OR THREE WAY OPERATION

CROSS-REFERENCE TO RELATED APPLICATION

The valve of this application is particularly advantageous for use in conjunction with the invention of my copending application Ser. No. 541,126, filed Jan. 15, 1975 and entitled "Mounting of Cylinders in Friction Brakes and Clutches".

BACKGROUND OF THE INVENTION

1. Field of the Invention

The invention relates to the construction of valves for controlling a flow of air or other fluid.

2. Description of Prior Art

In many prior art devices actuated by fluid under pressure, such as pneumatic piston and cylinder assemblies, elaborate piping has been provided for delivery of the fluid. Some systems for fluid delivery require high precision machining of parts. In is desirable to provide a relatively simple and reliable valve which can be economically manufactured and is easy to operate.

SUMMARY OF THE INVENTION

The valve arrangement of the present invention is reliable, easy to manufacture and adaptable to a wide variety of uses. For example, the valve can be incorporated in the housing of a pneumatic cylinder of the type shown in my United States patent application Ser. No. 541,126, the disclosure of which is hereby expressly incorporated herein in its entirety.

A wide variety of industrial equipment includes pneumatic, hydraulic or other fluid actuated devices which require the controlled delivery of fluid under pressure. For example, a pneumatic piston may be extended by the introduction of air to a chamber behind the piston and then retracted by venting of the air in the chamber. The valve of the present invention can be employed for this purpose, since in an "open" position, an L-shaped passage through the movable stem of the valve will deliver air to the chamber; in a closed position of the valve the delivered air will be trapped in the chamber; and in an intermediate position of the stem, the delivery passage will be blocked while a vent space is open for escape of air while the piston retracts.

To accomplish these functions, or for other fluid control purposes, the valve of the invention preferably has a stem with a generally cylindrical body for sliding fit in a cylindrical bore of a housing member of the like. At its outer end the valve stem has a circumferentially extending lip which acts as a stop when the valve stem is in a fully open position, pushed into the housing member. This outer end of the valve stem also has means such as an elbow or other fitting, for connection to a fluid supply conduit.

An L-shaped passage leads from the fluid supply connection through the body of the valve stem to open out through the wall of the stem. That is, the passage has one leg extending axially through the valve stem and another leg directed perpendicular to the axial leg.

A channel formed in the housing member opens on to the bore at the position of the delivery end of the L-shaped passage when the valve stem is in its open position.

In one preferred embodiment of the invention a circumferential groove is provided in the valve stem at the opening of the passage, and a pair of O-ring seals are positioned in circumferential grooves in the valve stem on both sides of the passage opening.

Inward of the opening of the passage through the valve stem wall, the body of the valve stem is of a reduced diameter considerably smaller than the base diameter. At its inner end, stop means limit the outward movement of the valve stem. For this purpose a retaining ring interfitted with means at the valve stem's inner end is currently preferred.

When the valve stem has been pulled out to its extreme outward position with the stop means engaged with means of the housing member, the passage of fluid is hindered or prevented. If the stop means is a retaining ring, slow leakage or bleeding of fluid occurs. If the stop means is a seal, no leakage can occur. There can be two venting positions for rapid or slow fluid discharge; or just one venting and one fully closed position.

For rapid discharge of fluid, in a position intermediate between the fully open position and the fully closed position, fluid can pass freely from the channel in the housing to the space surrounding the inner part of the valve stem, which is of a diameter smaller than the bore through the housing member. The retaining ring or other inner stop means is not in contact with the housing member, so the fluid can exit. This intermediate position allows the pressure chamber of a cylinder to be vented substantially instantaneously.

The valve stem body can be formed of any suitable commercially available material. The housing member in whose bore the valve stem is fitted, should be of the same material.

These and other uses and advantages of the valve of the invention will be more fully understood from the following detailed description of a preferred embodiment of the invention, especially when that description is read with reference to the accompanying drawing.

BRIEF DESCRIPTION OF THE DRAWING

FIG. 1 shows the valve arrangement of the invention used in conjunction with the housing of a piston and cylinder in a brake or clutch.

FIG. 2 is a view in section of the valve of the invention in open position.

FIG. 3 shows the valve of FIG. 2 in an intermediate position.

FIG. 4 shows the valve of FIGS. 2 and 3 in closed position.

DETAILED DESCRIPTION OF A PREFERRED EMBODIMENT

FIG. 1 illustrates a use of the valve arrangement of the present invention for controlling the supply of air to a housing member 10 in the form of application pod of the type shown in my aforementioned applicaion Ser. No. 541,126. The valve is generally indicated by the reference numeral 11 in FIG. 1, and is seen to be connected to a supply line 12, which can be a flexible hose leading from a source of air under pressure. The valve 11 is compact, fits close to the housing 10 and is thus protected against possible damage. As will more fully appear hereinafter, the valve 11 is of a push-pull type that can be easily operated to charge the pressure chambers of the pistons generally indicated at 13 in FIG. 1, to discharge the chambers by venting to the atmosphere, and in closed position to prevent entry and prevent or delay the exit of air.

As shown in FIGS. 2–4, the housing 10 has spaced parallel faces 14 and 15 which will be referred to as the "outer" and "inner" faces respectively, for convenience. A cylindrical bore 16 is formed through the housing 10 perpendicular to the faces 14, 15. In some other application of the invention, the valve 11 could be fitted in a cylindrical bore through a housing element of a different type from the housing 10 of the drawing. What is illustrated is shown by way of example to indicate that the valve is fitted in a cylindrical bore through some kind of housing member. The housing 10 has a channel 17 leading from the interior of the bore 16 to lead fluid delivered thereto to and from fluid actuated means which in the application shown comprises the pneumatic pistons 13. In other applications the valve 11 could be used to control fluid supply to fluid motors, other kinds of single or double acting pistons, etc. It will be noted that the valve 11 is highly advantageous in the illustrated environment because of its reliability and effectiveness, although other uses are contemplated.

Reverting to the illustration of FIGS. 2–4, it will be seen that the valve 11 has a generally cylindrical body 20 constituting a valve stem, sized to fit closely but slidably within the bore 16. At its outer end the valve body 20 is widened by an integrally formed circumferentially extending lip 21, larger in diameter than the bore 16 and which acts as a stop means when the valve body 2 is pushed in to its innermost position as shown in FIG. 2, whereat the lip 21 engages the outer face 14 of the housing 10.

In the preferred embodiment of FIGS. 2–4, the valve body 20 is formed with an internally threaded cylindrical socket shown at 22 for receiving an externally threaded fitting 23 for connection to a source of fluid under pressure. FIGS. 1 and 2 show the fitting 23 as an elbow of a commercially available type, connected by a nut 24 to the flexible hose 12, but various other kinds of fittings will suggest themselves to those acquainted with the art. The elbow shown at 23 in the drawing is illustrated as a presently preferred fitting which is compact and sturdy, which permits direction of the hose 12 generally parallel to the housing face 14 and is therefore particularly suited to the application of the valve of the invention in combination with brake or clutch housing means 10 of the type shown.

A passage 26 through the fitting 23 leads fluid into the valve body 20. At its inner end the passage 26 communicates with an L-shaped passage 30 formed in the valve body 20. An axially extending leg 31 of the L-shaped passage 30 leads from the passage 26 to a point about halfway along the length of the valve body 20 at which point the passage 30 has a right-angle bend to form a radially extending passage leg 32 which leads out to an opening 34 at the cylindrical wall 35 of the valve body 20.

As shown in FIG. 2, when the valve body 20 is pushed in to its inner position the radial leg 32 and opening 34 of the passage 30 open on to the channel 17 of the housing 10, and air or other fluid under pressure can pass freely from the source of fluid to the channel 17 and thence to the pressure chamber of a piston 13 or other fluid actuated device.

In the embodiment shown, provision has been made to prevent rotation of the valve body 20 about its axis from cutting off the flow of fluid while the valve 11 is in the open position of FIG. 2. This has been achieved by providing a circumferential groove 36 around the valve body 20 at the location of the outlet 34, so that if the outlet 34 and channel 17 are not in registry, fluid can flow to the channel 17 around the valve body 20 along the groove 17. Alternatively, a groove could be cut in the wall of the bore 16 at the inlet of the channel 17 but that would require more difficult manufacturing techniques. The valve body 20 and housing 10 could also be provided with some kind of interfitting means such as a slot and key to prevent relative rotation, or the valve body could be some other shape than cylindrical whereby rotation would be prohibited. The preferred embodiment shown has the advantage of simplicity.

Toward the outer and inner ends of the valve body from the location of the outlet 34 a pair of seals 40 and 41 illustrated in FIGS. 2–4 as O-rings are fitted in circumferential grooves cut into the body 20. These seals prevent the escape of fluid between the slidably interfitted valve body 20 and the bore 16 when the valve 11 is in its open position as shown in FIG. 2. Depending on the nature of the fluid to be controlled by the valve 11, O-rings, lip seals or the like of suitable material would be provided at 40 and 41.

Near the inner end of the valve stem, the valve body 20 has a portion 42 of reduced diameter, which in effect provides a wide but shallow groove 43 encircling the valve body. This groove 43 is effective when the valve 11 is in the condition shown in FIG. 3. At the intermediate position of the valve body 20 shown in FIG. 3, the outlet 34 is removed from the channel 17, and flow is cut off from the passage 30 to the channel 17, with the inner seal 41 interposed therebetween. However, the channel 17 opens on to the groove 43 formed around the reduced diameter of the valve body at 42. Accordingly, fluid under pressure can flow back rapidly from the channel 17 into the groove 43 and exit to the ambient at the inner face 15 of the housing member 10. This permits substantially instantaneous venting of a pressure chamber or the like when the valve 11 is pulled partially outward.

The condition of the valve 11 when the body has been pulled fully outward is illustrated by FIG. 4. As shown in the drawing, the valve body 20 at its inner end resumes its full diameter and the valve body terminates in a portion 50 sized to fit closely yet slidably within the bore 16. This portion 50 of the valve body 20 carries a member 51 fitted in a groove 52 encircling the body 20 at the portion 50. In the condition of FIG. 4, the portion 50 has been partially drawn into the bore 16, closing the groove 43 against rapid exit of fluid therefrom. The member 51 is in contact with the inner face of the housing 10.

If the member 51 is simply a retaining ring, some bleeding of fluid from the channel will be permitted, since there is no tight seal. The valve is thus a three-way element, with one charging and two discharging positions for instantaneous or slow venting.

In certain other applications, a third O-ring in a groove is employed in addition to the retaining ring 51. This third O-ring, located at the area indicated at 43 in the drawing, allows a user to turn the valve off without fluid escaping from the cylinder. In this case no venting would be permitted when the valve is in the fully closed condition of FIG. 4.

Numerous variations, substitutions of mechanical elements, adaptations and uses of the valve arrangement of the invention will suggest themselves to those familiar with the art, and are considered to be within the spirit and scope of the invention.

What is claimed is:

1. A push-pull valve having a generally cylindrical body, an L-shaped passage within the body, a fitting in an axial socket at one end of said body for admitting fluid under pressure to an axially extending leg of said L-shaped passage and outlet means through a side wall of said body for delivery of fluid from a radially extending leg of said L-shaped passage, said body being formed with a circumferential groove at the outlet end of said radially extending leg, said body having a cylindrical portion of reduced diameter spaced from an end of said body opposite said one end, a retaining lip integrally formed with said body at said one end extending circumferentially outward from said body and a retaining ring member, fitted in a groove encircling said body adjacent said opposite end.

2. The valve of claim 1 wherein said body has a pair of further circumferential grooves for receiving sealing members spaced on opposite sides of the circumferential groove at the outlet end of said radially extending leg, and a sealing member in each of said further grooves.

3. A valve assembly comprising a housing member having spaced, parallel inner and outer faces, a generally cylindrical bore, extending perpendicularly to said faces from one to the other of said faces, a channel extending generally parallel to said faces through said housing member from said bore for the flow of fluid under pressure, a generally cylindrical valve body fitted closely but slidably within said bore, said valve body having an L-shaped internal passage, means for delivering fluid to an axially extending leg of said internal passage, a retaining lip integrally formed at an outer end of said body for engagement with the outer face of said housing member only when said body is in an open position with a radially extending leg of the internal passage in communication with said channel, a retaining ring fitted in a groove encircling an inner end of said body for engaging the inner face of said housing member only when said body is in a closed position with said internal passage blocked against communication with said channel, and means comprising a cylindrical portion of said body of reduced thickness for venting through said channel and through an annular space open between said bore and the body portion of reduced thickness rapidly when said body is in a position intermediate between said open and closed position.

4. The valve assembly of claim 3 wherein said radially extending leg of said internal passage opens through a side wall of said body at a location where a circumferential groove formed in said body encircles the body.

5. The valve assembly of claim 3 and including means for sealing against leakage from said internal passage to said channel when the valve is not in said open position.

6. The valve assembly of claim 5 wherein said sealing means comprises a sealing member fitted in a circumferential groove formed in said body.

7. The valve assembly of claim 3 wherein a pair of ring-type seals encircle said body on opposite sides of an opening of said radially extending passage leg through a side wall of said body.

8. The valve assembly of claim 3 wherein the diameter of said body at said inner end is substantially equal to the diameter of said bore for close yet sliding fit within said bore when said body is not in open or intermediate position.

9. In combination with a fluid actuated device mounted in a housing having spaced parallel inner and outer faces, a push-pull valve assembly mounted in a bore extending perpendicularly through said housing from one to the other of said faces for delivery of fluid under pressure to said fluid actuated device and for venting fluid from said fluid actuated device, said valve assembly comprising a generally cylindrical valve body having an internal L-shaped passage extending from a fitting at an outer end of said valve body axially through said body and then radially through said body to an outlet in a side wall of said body so that in open position said opening is in communication with a channel formed within said housing and extending to said fluid actuated device, said body having an integral outwardly extending lip formed at the outer end of said body for engagement with the outer face of said housing only when said valve is in open position and a retaining ring in a circumferential groove adjacent the inner end of the valve body for engagement with the inner face of the housing only when said valve is in closed position, and a portion of said valve body between said opening and said inner end of the body having reduced thickness to provide a space for venting fluid from said channel rapidly when said valve is in an intermediate position between said open and closed position.

10. The combination of claim 9 wherein said fluid actuated device is a pneumatic piston and said channel leads to the pressure chamber of such pneumatic piston for charging and venting of the pressure chamber.

* * * * *

UNITED STATES PATENT AND TRADEMARK OFFICE
CERTIFICATE OF CORRECTION

PATENT NO. : 4,000,685
DATED : January 4, 1977
INVENTOR(S) : Edwin J. Montalvo, Jr.

It is certified that error appears in the above-identified patent and that said Letters Patent are hereby corrected as shown below:

Col. 1, line 21 - "In is desirable" should be
--It is desirable--

Col. 1, line 50 - "housing member of the like" should be
--housing member or the like--

Col. 2, line 55 - "in the form of application pod" should be
--in the form of a pod--

Col. 3, line 29 - "valve body 2" should be
--valve body 20--

Signed and Sealed this

Third Day of May 1977

[SEAL]

Attest:

RUTH C. MASON
*Attesting Officer*

C. MARSHALL DANN
*Commissioner of Patents and Trademarks*